(12) United States Patent
Jensen

(10) Patent No.: US 7,452,153 B2
(45) Date of Patent: Nov. 18, 2008

(54) FITTING FOR JOINING SCAFFOLD BOARDS

(75) Inventor: Jan Mong Lund Jensen, Vildbjerg (DK)

(73) Assignee: PF Management Holding ApS, Vildbjerg (DK)

( * ) Notice: Subject to any disclaimer, the term of this patent is extended or adjusted under 35 U.S.C. 154(b) by 0 days.

(21) Appl. No.: 10/883,041

(22) Filed: Jul. 2, 2004

(65) Prior Publication Data

US 2005/0013655 A1    Jan. 20, 2005

(30) Foreign Application Priority Data

Jul. 4, 2003    (DK) ............................... 2003 01024

(51) Int. Cl.
*E04G 7/08*    (2006.01)
(52) U.S. Cl. ........................ 403/49; 403/338
(58) Field of Classification Search ............... 403/326, 403/329, 49, 338, 258, 260, 341, 373, 396, 403/DIG. 9, 256; 182/179.1, 186, 223, 150, 182/113, 185; 108/64, 65; 248/200.1, 500; 24/527; 312/140, 111

See application file for complete search history.

(56) References Cited

U.S. PATENT DOCUMENTS

| | | | | |
|---|---|---|---|---|
| 1,018,877 A | * | 2/1912 | Chickering | 182/206 |
| 1,760,346 A | * | 5/1930 | Correa | 24/72.5 |
| 1,778,700 A | * | 10/1930 | Whittier et al. | 248/72 |
| 2,227,365 A | * | 12/1940 | Prevost | 24/527 |
| 2,411,053 A | * | 11/1946 | Ornsteen | |
| 2,470,991 A | * | 5/1949 | Kindorf et al. | 248/72 |
| 2,628,800 A | * | 2/1953 | Kindorf et al. | 248/72 |
| 3,091,011 A | * | 5/1963 | Campbell | 280/814 |
| 3,140,848 A | * | 7/1964 | Sherburne | 248/72 |
| 3,425,099 A | * | 2/1969 | Lehoczky | 24/16 R |
| 3,465,995 A | * | 9/1969 | Whitman | 248/228.3 |
| 4,263,984 A | * | 4/1981 | Masuda et al. | 182/113 |
| 4,536,926 A | * | 8/1985 | Pantaleo | 24/523 |
| 4,541,155 A | * | 9/1985 | Gagnon | 24/486 |
| 4,794,675 A | * | 1/1989 | Bisconti | 24/455 |
| D351,984 S | * | 11/1994 | Victor | D8/331 |
| 5,676,341 A | * | 10/1997 | Tarusawa et al. | 248/430 |
| 6,026,932 A | * | 2/2000 | Comp | 182/150 |
| D484,388 S | * | 12/2003 | Nassie et al. | D8/330 |
| 6,898,905 B1 | * | 5/2005 | Kirschner | 52/127.5 |

FOREIGN PATENT DOCUMENTS

| | | | |
|---|---|---|---|
| DK | 163443 | | 3/1992 |
| JP | 06323044 A | * | 11/1994 |
| JP | 2000-240279 | * | 9/2000 |

* cited by examiner

*Primary Examiner*—Robert J. Sandy
*Assistant Examiner*—Joshua T Kennedy
(74) *Attorney, Agent, or Firm*—James Creighton Wray; Clifford D. Hyra

(57) ABSTRACT

A fitting for transverse joining of two L-shaped sections is provided, each L-shaped section with a web part and a foot part. The sections are disposed with the web part back-to-back, being peculiar in that the fitting substantially includes a first flange and a second flange which are J-shaped and which in mutual contact are slidingly connected with a connection for constituting a largely C-shaped fitting with a gap of variable length for accommodating the two foot parts of the L-shaped sections. The fitting includes means for mutual fixation of the two flanges for retaining the length of the C-shaped fitting after receiving both foot parts in the C-shaped fitting.

10 Claims, 3 Drawing Sheets

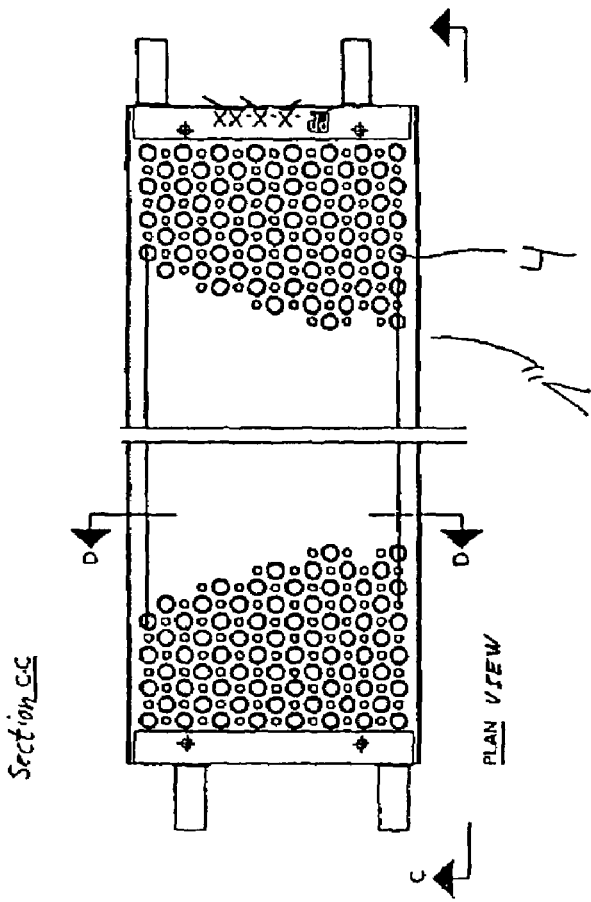
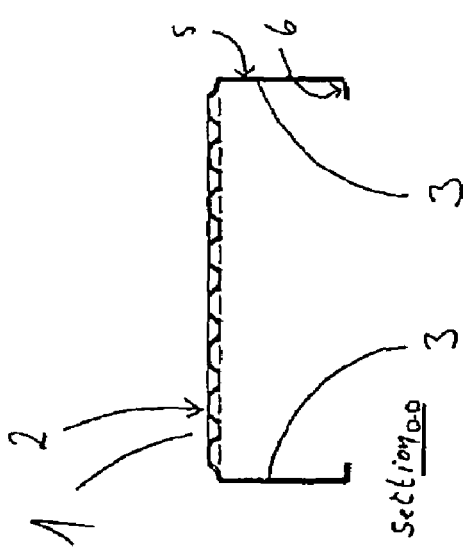

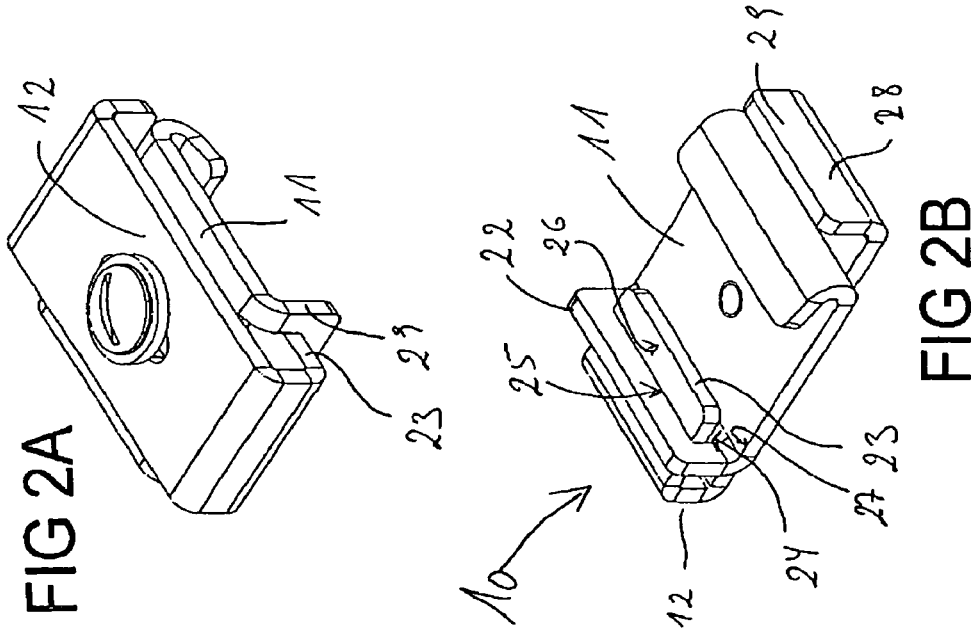
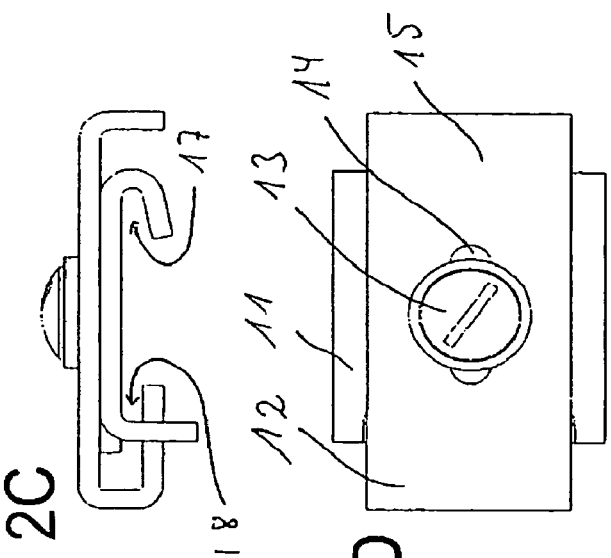
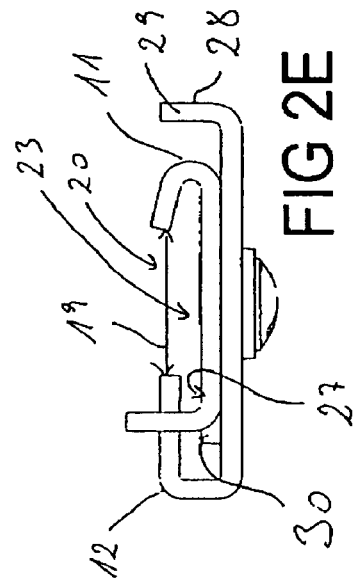

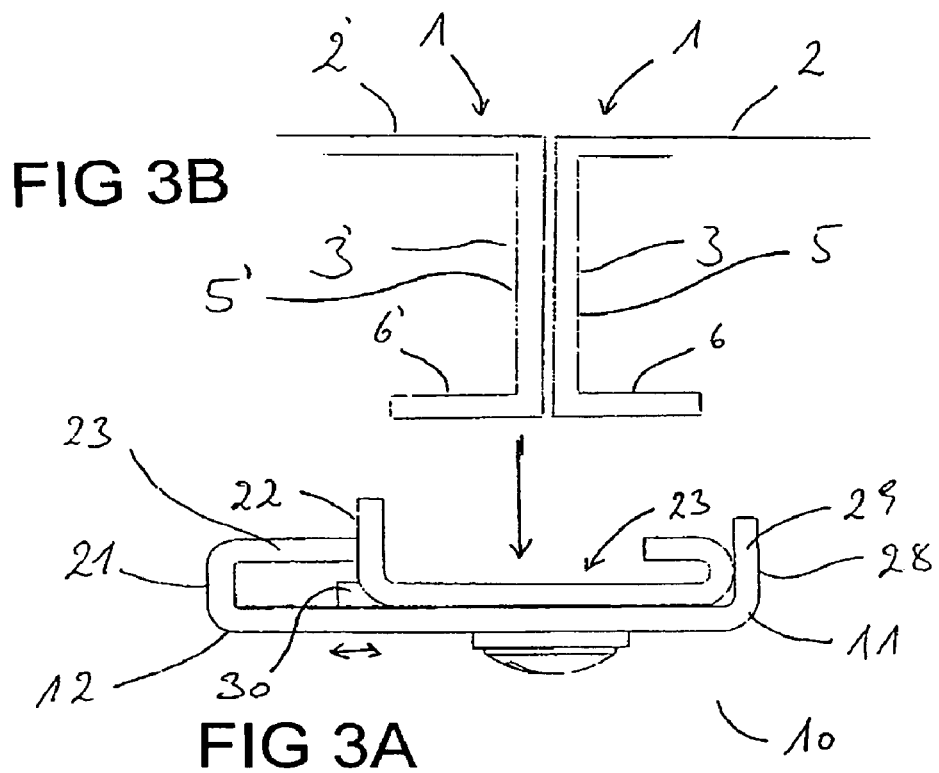
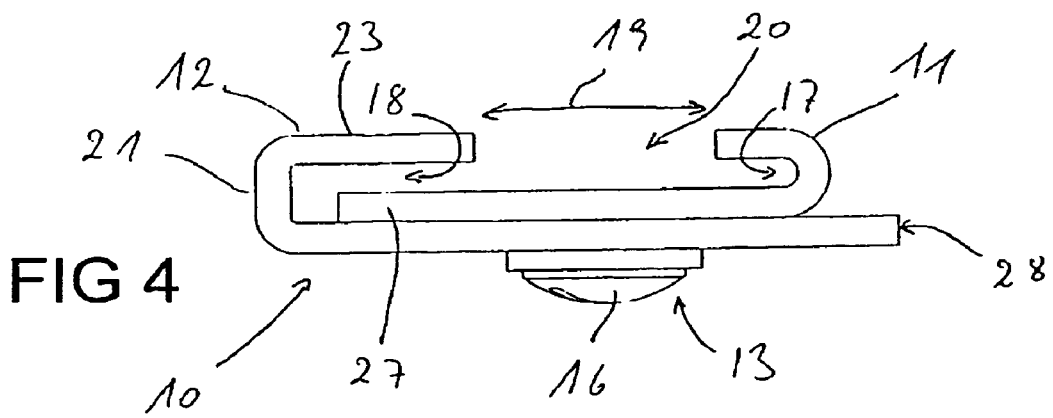

FITTING FOR JOINING SCAFFOLD BOARDS

This application claims the benefit of Danish Application No. 2003 01024 filed Jul. 4, 2003.

BACKGROUND OF THE INVENTION

1. Field of the Invention

The present invention concerns a fitting for transverse joining of two L-shaped sections, each with a web part and a foot part, where the sections are disposed back-to-back, e.g. scaffold boards.

2. Description of Prior Art

Scaffold boards of the type with a board face provided with downwards extending L-shaped sections at both long sides so as to constitute a substantially C-shaped cross-section in the assembled state are prior art. Such a scaffold board is shown in FIGS. 1A-1C.

Such scaffold boards typically have a width of about 30 cm, and therefore it is common to dispose several boards side by side in order to achieve a wider surface to walk on. If the load on a board is greater than the load on the adjacent board, the first-mentioned board will be deflected more than the other, whereby an edge or a step appears, which is undesirable. Besides, it is generally desirable to assemble several boards together in a mechanical way in order thereby to enhance the load capacity of the boards by transferring forces from one board to the adjacent boards.

Means for assembling such boards exist. For example, it is prior art to provide the boards with pieces of flat bar welded on and with a hole for bolting together with a top fitting. This method has a number of drawbacks. Firstly, special tools are to be used for this assembling method, which is inexpedient, as the tool is sometimes to be transported to great heights and used under difficult weather conditions. Secondly, several components are to be used for the bolting, which is inexpedient as it requires considerable capacity for storage and logistics on the part of the scaffold firms. A third drawback is that this method implies very little freedom for mutual disposition of the boards as the boards only can be assembled so that the flat bar pieces overlap. Furthermore, this prior art assembling method has the drawback that it takes up space 8-15 mm in vertical direction, increasing the possibility of accidents where the workmen on the scaffold hit their heads on the joints.

Furthermore, there is a prior art solution where the boards are provided with holes in the side members of the boards which are then to be assembled with bolts, nuts and washers. This method also has a number of drawbacks. Firstly, in this case special tools are to be used for this assembling method, which is inexpedient as it is sometimes to be lifted to great heights and to be used under difficult weather conditions. Secondly, more components are to be used for the bolting together, which is inexpedient as it requires considerable capacity for storage and logistics on the part of the scaffolding firms. A third drawback is that bolts, washers and nuts are in danger of falling down from great heights since it can be difficult to assemble the relatively numerous components.

SUMMARY OF THE INVENTION

Description of the Invention

It is thus the purpose of the invention to provide new means that are suited for assembling scaffold boards of the above type, where the means do not have the mentioned disadvantages.

This purpose is achieved with a fitting for transverse joining of two L-shaped sections, each with a web part and a foot part, where the sections are disposed back-to-back, where the fitting substantially includes a first flange and a second flange which are J-shaped and in mutual contact and which in mutual contact are slidingly connected with a connection for constituting a largely C-shaped fitting with a gap of variable length for accommodating the two foot parts. The fitting furthermore includes means for mutual fixation of the two J-shaped flanges for retaining the length of the C-shaped fitting after receiving both foot parts in the C-shaped fitting.

Fittings according to the invention are primarily intended to be used for transverse connection of mutually abutting scaffold boards, where the scaffold boards each are of the type with a board face provided with downwards extending L-shaped sections as side members at both long sides so as to constitute a substantially C-shaped cross-section. The fitting according to the invention may, however, also be used in other connections for securing L-shaped sections.

Such a fitting has many advantages. With the fitting is achieved a very stable assembly of L-shaped sections and in particular a stable assembly of scaffold boards of the above type so that forces can be transmitted from one board to the other. In case of someone losing the fitting, the latter cannot fall through the scaffold deck as the fitting will have a dimension greater than the 20 mm allowed as maximum in the deck. The fitting provides for the requirement that the assembly parts are to comprise as few components as possible, where in case of using the fitting there is only the fitting without any other required accessories. Assembling of the boards can only occur with an arbitrary mutual longitudinal disposition of the boards; the requirement is only that they abut on each other with their L-shaped sides. The assembly device is very low-profiled, meaning that the risk of injuries on the workmen due to bumping on the assembly with the head is minimised. In a simple way is thus provided a fitting with a great number of advantages.

The connection in the fitting can e.g. include a screw for fastening in the back of the first flange, where the screw extends through the opening in the back of the other flange.

In a preferred embodiment, the first flange has a first hollow with a width larger than the width of one foot part for accommodation of the one foot part without clamping action, and where a hollow of the second flange has a width which is less than the sum of the material thickness of the other foot part and the material thickness of the first flange at the length extending into the hollow of the second flange. Thereby accommodation of this second foot part is allowed under clamping action only, providing great friction between the fitting and the clamped foot part. This embodiment is very suitable when applied, as the accommodation of the one L-shaped side member under clamping action ensures that the fitting remains securely in the disposed position.

In order to facilitate disposition of the fitting on the L-shaped sections, such as side members of the board, and yet to ensure a stable and secure position, the first hollow is designed so that it narrows.

In a further embodiment, the first flange is furthermore provided with a first bent lug in order to achieve a largely G-shaped cross-section. This is very useful at the mounting of the fitting on the foot parts of the L-shaped sections, when the two foot parts are received in the space formed between the hollow and the first bent lug. The displacing of the second flange in relation to the first flange for locking the foot parts in this space may thus be effected by striking one end of the second flange with a hammer, whereby the second flange will be displaced in relation to the first flange, because the first lug provides that the first flange cannot be displaced in relation to the foot parts that rest firmly on the lug.

The first lug may advantageously have a notch for accommodating the bent part of the second flange. The notch is furthermore dimensioned for contact of the inner edge of the notch with the outer edge of the bent part of the second J-shaped flange in order to prevent deflection of the bent part of the second J-shaped flange when accommodating the foot parts of the L-shaped side member under clamping action.

Furthermore, the second J-shaped flange may be provided with a second bent lug in order to achieve a substantially G-shaped cross-section, where the lug is intended as striking surface when dismounting the fitting and as stop by mutual displacing of the two flanges.

SHORT DESCRIPTION OF THE DRAWING

The invention is described more closely with reference to the drawing, where:

FIGS. 1A-1C show three views of a scaffold board according to prior art; FIGS. 2A-2E show the fitting according to the invention in a preferred embodiment; FIGS. 3A and 3B show the preferred embodiment together with two L-shaped side members;

FIG. 4 shows the fitting according to the invention in a simplified embodiment.

DETAILED DESCRIPTION OF THE INVENTION

FIGS. 1A-1C show a drawing of a scaffold board 1 according to prior art in three different views, namely cross-section 1, longitudinal section 1' and seen from above 1". The board has board surface 2 and two downwards facing L-shaped sections as side members 3, 3' with web part 5, 5' and foot part 6, 6' for largely constituting an assembled and more or less sharp-edged C-shaped cross-section 1. Typically, scaffold boards are provided with holes 4 so that dust and rain do not collect on the surface 2. The fitting 10 is shown in a simplified version on FIG. 4. The fitting 10 includes substantially a first J-shaped flange 11 and a second J-shaped flange 12 which are in mutual contact and mutually displacing connected with a connection 13 in order to constitute a mainly C-shaped fitting with variable length 19 of the aperture 20 for accommodating the foot parts 6, 6' of the L-shaped side members 3, 3' disposed with their web parts 5, 5' back to back. The accommodation of the L-shaped side members 3, 3' of the boards 1 when the sides of these are abutting on each other, is illustrated on FIG. 3 where the fitting 10, however, is shown in a second and more preferred embodiment.

As shown on FIG. 4, the fitting 10 furthermore includes means for mutual fixation of the two J-shaped flanges 11, 12 after adjusting the length 19 of the aperture 20 in the C-shaped fitting 10 for accommodating both L-shaped side members in the C-shaped fitting. Such means can include a screw 16 extending through an aperture 14 in the back 15 of the second J-shaped flange 12 shown on FIG. 2, and is screwed in the first J-shaped flange 11 for fixing the two flanges 11, 12.

In a preferred embodiment, such a screw 16 will, however, not be used for fixation but only for a sliding assembly 13, where the screw 16 is fastened in the first flange 11, e.g. by welding, and otherwise loosely extending through the aperture 14 of the first flange 11, as shown in FIGS. 2A -2E in greater detail.

The means for fixation is then constituted in another way as explained in the following with reference to FIGS. 2A-2E. In that case, the first flange 11 has a first hollow 17 with a width greater than the width of the one foot part 6 for accommodating this foot part 6 without clamping. In contrast, the hollow 18 of the second flange 12 has a width slightly less than the sum of the material thickness of the second foot part 6' and the material thickness of the first flange 11 on the length 27 extending into the hollow 18 of the second flange 12, in order thereby to allow accommodation of the other foot part 6' under clamping action.

The second hollow 18 is thus the one forming part of the fixation. In this case, the fitting 10 is placed with the first hollow 17 over the foot part 6 of the first L-shaped side member 3 so that the foot part 6 is enveloped by the first hollow 17, after which the fitting 10 is brought into contact with the second L-shaped side member 3'. A reduction of the length of the C-shaped fitting 10 will result in accommodation of both foot parts 6, 6' of the L-shaped side members 3 in the hollows 17, 18. This reduction may now be attained by compressing the two flanges 11, 12 with a suitable tool, e.g. a pair of tongs, so that the flange 12 with its hollow 18 is compressed around the second L-shaped side member 6' which is now held under clamping action in the second hollow 18 simultaneously with the length 19 of the aperture 20 of the C-shaped fitting no longer changes, as the two flanges 11, 12 under pressure. This embodiment is, however, not the preferred, as scaffold workers typically want to avoid going around with a pair of tongs. Therefore, the invention is preferred in a further development as explained in the following.

The most preferred embodiment is thus shown in FIGS. 2A-2E in different perspective views. The first flange 11 of the fitting 10 is further provided with a first bent lug 22 in order thereby to achieve a substantially G-shaped cross-section. The function of this lug 22 appears more clearly from FIGS. 3A and 3B. The two foot parts 6, 6' of the L-shaped sections 3, 3' disposed with the mutually abutting web parts 5, 5' may thus be accommodated in the space 23 formed between the hollow 17 and the first bent lug 22. The foot parts 6, 6' may be inserted in the space 23 when this has been opened, as shown in FIGS. 3A and 3B. After inserting the foot parts 6, the second flange 12 is displaced in relation to the first flange 11, whereby the length 19 of the aperture 20 is reduced and the foot parts 6 are retained in the space 23.

The advantage of the lug 22 shown in FIGS. 3A and 3B is that the displacement of the second flange 12 in relation to the first flange 11 for locking the foot parts may be effected by placing the fitting 10 around the foot parts 6 and then striking one end 21 with a hammer, whereby this second flange 12 will be displaced in relation to the first flange, as the lug 22 provide for the first flange 11 not being displaced in relation to the foot parts 6 that bear firmly on the lug 22. In that way, the foot part 6' is pressed into the hollow 18 of the second flange 12 under clamping with high friction, ensuring that the fitting does not slide off the foot parts unintentionally.

The first lug 22 may be shorter than shown on FIGS. 2 and 3 and may only extend to right under the edge of the turned-in part 23 of the second flange. It is, however, preferred that the first lug 22 is longer and has a notch 24 for accommodating the bent part 23 of the second flange 12. With its inner edge 25, the notch 24 is dimensioned to bear against the outer edge 26 of the bent part 23 of the second flange 12 in order to prevent deflection of the bent part 23 of the second flange 12 when accommodating the foot parts 6 under clamping action.

In order to release the fitting 10 again from the mounting on the foot parts 6 which are clamped between the hollows 17, 18, a hammer may e.g. be used for striking the other end 28 of the second flange. Since the foot parts 6 of the L-shaped sections 3 are retained in the first hollow 17 during such a strike, the second flange 12 will be displaced in relation to the first flange 11, and the fitting 10 may then come loose from the foot parts. In order to enlarge the face receiving the hammer strike, the second flange 12 is provided with a second bent lug 29 at its other end 28 so as to provide a substantially G-shaped cross-section. This second lug 29 also acts as a stop for the mutual displacement between the first 11 and the second flange 12. In connection with displacement in the opposite direction, the first flange 11 may also be provided with a corresponding stop 30, as shown on FIGS. 2 and 3.

It is a great advantage to the scaffold workers that the fitting can be fitted and released again by only using a hammer, avoiding other tools, as a hammer is a tool already in use and thus permanent equipment for the scaffold workers.

In order that the foot parts 6 may inserted in the space 23, the first flange 11 in the embodiment shown in FIGS. 2A-2E is provided with a first hollow 17 which is narrowing.

The invention claimed is:

1. Fitting for transverse joining of two L-shaped sections each with a web part and a foot part, separably connected to each other by said fitting with the web parts abutting back-to-back, comprising a first flange and a second flange which are J-shaped with straight back sections and bent parts, wherein the straight back section of one of the flanges is substantially parallel to the tip of the bent part of that flange, and which in mutual contact along an exterior surface of their straight back sections are slidingly connected with a connection for constituting a largely C-shaped fitting with a gap of variable length for accommodating the two foot parts of the L-shaped sections, and wherein the first flange has a first hollow for part for accommodation of one foot part without clamping action, and wherein a hollow of the second flange has a width which is less than the sum of the material thickness of the first flange at a length extending into the hollow of the second flange and the width of the first hollow at its narrowest point in order thereby to allow accommodation of the other foot part under clamping action; wherein the first flange is further provided with a first bent lug on its straight back section and wherein the first bent lug is intended for bearing against the foot parts after inserting the foot parts in the first flange and wherein the first lug has a notch for accommodating the bent part of the second flange, and wherein the notch is dimensioned for contact with the outer edge of the bent part of the second flange with an inner edge of the notch in order to prevent deflection of the bent part of the second flange when accommodating the foot parts under clamping action.

2. Fitting according to claim 1, wherein the connection includes a screw for fastening in the back of the first flange, and wherein the screw extends through an aperture in the back of the second flange.

3. Fitting according to claim 1, wherein the first hollow is narrowing.

4. Fitting according to claim 1, wherein the second flange is provided with a second bent lug on its straight back section, and wherein the second bent lug is intended as a striking surface when dismounting the fitting.

5. Fitting according to claim 4, wherein the second bent lug is provided at the end of the straight back section of the second flange, such that the combination of the J-shaped second flange with the second bent lug is substantially G-shaped.

6. Fitting according to claim 1, wherein the first bent lug is provided at the end of the straight back section of the first flange, such that the combination of the J-shaped first flange with the first bent lug is substantially G-shaped.

7. Fitting assembly comprising a fitting transversely joining two L-shaped sections, wherein the two L-shaped sections each comprise a web part and a foot part, wherein the sections are separably connected to each other by said fitting with the web parts abutting back-to-back, wherein the fitting substantially includes a first flange and a second flange which are J-shaped with straight back sections and bent parts, wherein the straight back section of one of the flanges is substantially parallel to the tip of the bent part of that flange, and which in mutual contact are slidingly connected with a connection for constituting a largely C-shaped fitting with a gap of variable length for accommodating the two foot parts of the L-shaped sections, and wherein the fitting includes means for mutual fixation of the two flanges for retaining the length of the C-shaped fitting after receiving both foot parts in the C-shaped fitting, wherein the two L-shaped sections are a pair of downwardly extending side members at the long sides of two mutually abutting scaffold boards, each scaffold board having a substantially C-shaped cross-section formed by a board face and one said downwardly extending side member at both long sides of said board face; wherein the means for mutual fixation comprises the first flange being further provided with a first bent lug on its straight back section and wherein the first bent lug is intended for bearing against the foot parts after inserting the foot parts in the first flange and wherein the first lug has a notch for accommodating the bent part of the second flange, and wherein the notch is dimensioned for contact with the outer edge of the bent part of the second flange with an inner edge of the notch in order to prevent deflection of the bent part of the second flange when accommodating the foot parts under clamping action.

8. Fitting according claim 7, wherein the connection includes a screw for fastening in the back of the first flange, and wherein the screw extends through an aperture in the back of the second flange.

9. Fitting according to claim 8 wherein said screw is permanently affixed to said first flange.

10. Fitting for transverse joining of two L-shaped sections each with a web part and a foot part, separably connected to each other by said fitting with the web parts abutting back-to-back, comprising a first flange and a second flange which are J-shaped and which in mutual contact are slidingly connected with a connection for constituting a largely C-shaped fitting with a gap of variable length for accommodating the two foot parts of the L-shaped sections, and wherein the first flange has a first hollow for accommodation of one foot part without clamping action, and wherein a hollow of the second flange has a width which is less than the sum of the material thickness of the first flange at the length extending into the hollow of the second flange and the width of the first hollow at its narrowest point in order thereby to allow accommodation of the other foot part under clamping action, wherein the connection includes a screw for fastening in the back of the first flange, and wherein the screw extends through an aperture in the back of the second flange, wherein said screw is permanently affixed to said first flange but does not fix the flanges in place with respect to one another; wherein the first flange is further provided with a first bent lug on its straight back section and wherein the first bent lug is intended for bearing against the foot parts after inserting the foot parts in the first flange and wherein the first lug has a notch for accommodating the bent part of the second flange, and wherein the notch is dimensioned for contact with the outer edge of the bent part of the second flange with an inner edge of the notch in order to prevent deflection of the bent part of the second flange when accommodating the foot parts under clamping action.

* * * * *